United States Patent
Ebert

(10) Patent No.: US 7,542,534 B2
(45) Date of Patent: Jun. 2, 2009

(54) METHOD AND AN APPARATUS TO REDUCE ELECTROMAGNETIC INTERFERENCE

(75) Inventor: Gregory L. Ebert, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 618 days.

(21) Appl. No.: 11/237,042

(22) Filed: Sep. 27, 2005

(65) Prior Publication Data

US 2007/0071151 A1   Mar. 29, 2007

(51) Int. Cl.
*H04L 7/00*   (2006.01)
(52) U.S. Cl. ....................................................... 375/354
(58) Field of Classification Search ................. 375/130, 375/371, 373–376
See application file for complete search history.

(56) References Cited

U.S. PATENT DOCUMENTS

| | | | | |
|---|---|---|---|---|
| 5,867,524 | A * | 2/1999 | Booth et al. | 375/130 |
| 6,377,646 | B1 * | 4/2002 | Sha | 375/376 |
| 6,643,317 | B1 * | 11/2003 | Blumer | 375/130 |
| 7,230,981 | B2 * | 6/2007 | Hill | 375/226 |
| 7,233,210 | B2 * | 6/2007 | Kaizuka | 331/1 A |
| 7,400,696 | B2 * | 7/2008 | Chen et al. | 375/376 |
| 2005/0144468 | A1 * | 6/2005 | Northcutt et al. | 713/189 |

OTHER PUBLICATIONS

Intel, Intel 848 P Chipset, Platform Design Guide, for use with the Intel Pentium 4 Processor wth 512-KB L2 Cache on .013 Micron Process and the Intel Pentium 4 Processor on 90 nm Process, Mar. 2004, 6 pages total.

* cited by examiner

*Primary Examiner*—Khanh C Tran
(74) *Attorney, Agent, or Firm*—Blakely, Sokoloff, Taylor & Zafman LLP

(57) ABSTRACT

A method and an apparatus to reduce electromagnetic interference (EMI) have been presented. In one embodiment, the method includes using a first clock signal to create a second clock signal having a fundamental frequency lower than a frequency of the first clock signal, wherein the first clock signal is used to transmit data from a chip within a chip set to an interconnect. The method may further include outputting the second clock signal to the interconnect via a data channel of the chip as a forwarded clock signal. The signal power may be redistributed to lower fundamental frequency to reduce EMI emission from the system. Other embodiments have been claimed and described.

8 Claims, 4 Drawing Sheets

Generate a repeating data pattern using a clock signal to create a second clock signal having a fundamental frequency lower than the frequency of the clock signal
310

Alternate duty cycles in consecutive sub-periods
320

Output the repeating data pattern as a forwarded clock signal
330

Figure 3

METHOD AND AN APPARATUS TO REDUCE ELECTROMAGNETIC INTERFERENCE

TECHNICAL FIELD

Embodiments of the invention relate generally to electronics, and more particularly, to reducing electromagnetic interference.

BACKGROUND

In general, electromagnetic interference (EMI) is electromagnetic radiation from an electrical source that interrupts the normal function of an electronic device. EMI may cause noise in signal transmission between electronic devices. Thus, there has been on-going effort in developing effective EMI reduction techniques.

Currently, there are two common approaches to reduce EMI emission. If the EMI emission is primarily being caused by poor shielding and/or grounding at interconnect interfaces (e.g., external cable connector), the interconnect interfaces may be redesigned to increase shielding and/or grounding. However, redesigning the interconnect interfaces may add considerable cost to the interconnect. Furthermore, some interconnect interface may have to conform to existing industry-wide standards. Thus, it may be difficult to redesign these interconnect interface without modifying the applicable standards.

Another conventional approach to reduce EMI emission is to use spread spectrum clocking (SSC). SSC reduces EMI emission by spreading the radiated energy over a wider frequency band. Thus, instead of maintaining a constant system frequency, SSC modulates the clock frequency along a predetermined path (also referred to as a modulation profile). However, SSC may not be appropriate for certain applications, such as applications that pertain to video and audio, because modulation of the clock frequency may cause noticeable visual or audio distortion.

BRIEF DESCRIPTION OF THE DRAWINGS

Embodiments of the present invention is illustrated by way of example and not limitation in the figures of the accompanying drawings, in which like references indicate similar elements and in which:

FIG. 3 shows one embodiment of a process to reduce electromagnetic interference.

DETAILED DESCRIPTION

A method and an apparatus to reduce electromagnetic interference (EMI) is disclosed. In the following detailed description, numerous specific details are set forth in order to provide a thorough understanding. However, it will be apparent to one of ordinary skill in the art that these specific details need not be used to practice some embodiments of the present invention. In other circumstances, well-known structures, materials, circuits, processes, and interfaces have not been shown or described in detail in order not to unnecessarily obscure the description.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In one embodiment, digital clock signals that have a fundamental frequency lower than a given clock frequency are created using a data channel such that signal power may be redistributed to the fundamental frequency to reduce EMI emission. In one embodiment, a fundamental period of the digital clock signals includes a number of sub-periods, which are periods of time having substantially the same duration within the fundamental period. The duty cycles of the digital clock signals in the consecutive sub-periods may be alternated. Furthermore, the duty cycles of consecutive sub-periods may be complementary (e.g., 90/10 and 10/90) to maintain direct current (DC) balance.

Figure 1:
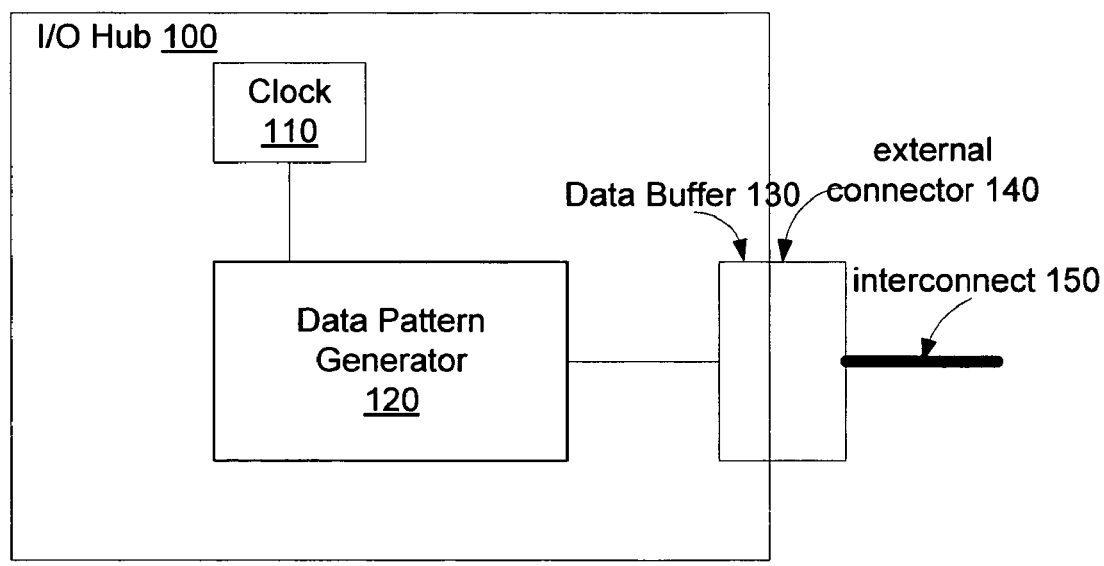
FIG. 1 shows one embodiment of an input/output hub.

FIG. 1 shows one embodiment of an input/output (I/O) hub in a chip set usable in a computer system. The I/O hub 100 includes a clock 110, a data pattern generator 120, and a data buffer 130. The data buffer 130 is coupled to an external connector 140, which provides shielding and/or grounding to reduce EMI emission from the I/O hub 100. The external connector 140 is further coupled to an interconnect 150. Some examples of the interconnect 150 include high definition multimedia interconnect (HDMI), digital display interconnect, etc. Via the interconnect 150, the I/O hub 100 may be coupled to other components in the computer system (e.g., an audio coder/decoder, a Universal Serial Bus (USB) port, etc.). Note that the I/O hub 100 may include more or less components than those shown in FIG. 1 in different embodiments. Furthermore, the I/O hub 100 is merely one example of a chip within the chip set in which the EMI reduction technique disclosed herein may be applied. It should be appreciated that the technique may be applied to other chips of the chip set, such as a memory controller (also known as a memory controller hub).

In one embodiment, the clock 110 generates a clock signal at a predetermined frequency. The I/O hub 100 may use the clock signal for various operations, such as data transmission. Thus, the predetermined frequency of the clock may also be referred to as the data rate or the bit rate in the following discussion. In general, the higher the clock frequency, the less effective the shielding and/or grounding of the interconnect 150, the I/O hub 100, and/or the external connector 140 are in reducing EMI emission from the I/O hub 100. Therefore, to increase the effectiveness of shielding and/or grounding, a forwarded clock signal with a fundamental frequency lower than the clock frequency is created.

In some embodiments, the data pattern generator 120 generates a repeating data pattern using the clock signal from the clock 110. The repeating data pattern is then output through the data buffer 130 as the forwarded clock signal. For instance, to get a forwarded clock signal at $1/10^{th}$ of the data rate, a repeating 10-bit data pattern having an equal number of 1's and 0's (e.g., 1111100000, etc.) is generated by the data pattern generator 120.

In one embodiment, a repeating 20-bit data pattern that has an equal number of 1's and 0's and still has a 0 to 1 transition every 10 bits (e.g., 10000000001111111110) is generated by the data pattern generator 120. The fundamental period of this pattern is 20 times the period of the clock signal generated by the clock 110. Thus, the fundamental frequency of this data pattern is $\frac{1}{20}^{th}$ of the data rate. Note that this pattern maintains a rising edge every 10 bits. In other words, the pattern has a fundamental period longer than the time between the consecutive rising edges of the pattern.

Alternatively, the above technique may be used to create a forwarded clock signal having a falling edge every 10 bits by inverting the data pattern. Thus, there is no need to modify edge-triggered receivers that receive data from the I/O hub 100 in order to accommodate this forwarded clock signal. This advantage will be further elaborated below with reference to FIG. 2.

In some embodiments, the duty cycles of the data pattern in consecutive sub-periods are complementary. For example, the 20-bit data pattern above has alternating duty cycles of 10/90 and 90/10, which are complementary. Having complementary duty cycles allows the data pattern to maintain DC balance, which allows differential signals to maintain zero DC offset between the differential pair as the data pattern is transmitted via the interconnect 150. Alternatively, other complementary duty cycle patterns may be used (e.g., 20/80 and 80/20) while the fundamental frequency is still at about $\frac{1}{20}^{th}$ the data rate. By using such duty cycle patterns, some energy may be moved from the fundamental frequency to harmonics of the fundamental frequency, which helps to reduce EMI emission. This may be important if the fundamental frequency is close to some predetermined limits of EMI (such as those promulgated by Federal Communications Commission (FCC)) and the harmonics are well below these limits.

To further reduce the fundamental frequency, the repeating data pattern may be extended. For instance, the data pattern may be extended from 20-bit to 30-bit long in order to further reduce the fundamental frequency from $\frac{1}{20}^{th}$ to $\frac{1}{30}^{th}$ of the data rate as long as the pattern has an equal number of 1's and 0's.

By reducing the fundamental frequency, high speed interconnects and/or interfaces (such as HDMI) may extend to higher frequencies without significantly increasing EMI emission, and hence, without substantially increasing the costs in reducing and/or containing EMI emission. Furthermore, the technique described herein does not involve modifying the interconnect 150 or the external connector 140. Thus, the technique may be easily applied on chip sets that are coupled to interconnects already having a well-defined specification, such as, for example, HDMI. Moreover, high speed chip sets may create repeating data patterns with little additional complexity, and thus, there may be negligible manufacturing costs added to the chip sets. Another advantage is that the technique described above may be compatible with many existing EMI reduction approaches (e.g., SSC). Thus, this technique may be applied in addition to some existing EMI reduction techniques to achieve greater EMI reduction.

Figure 2:
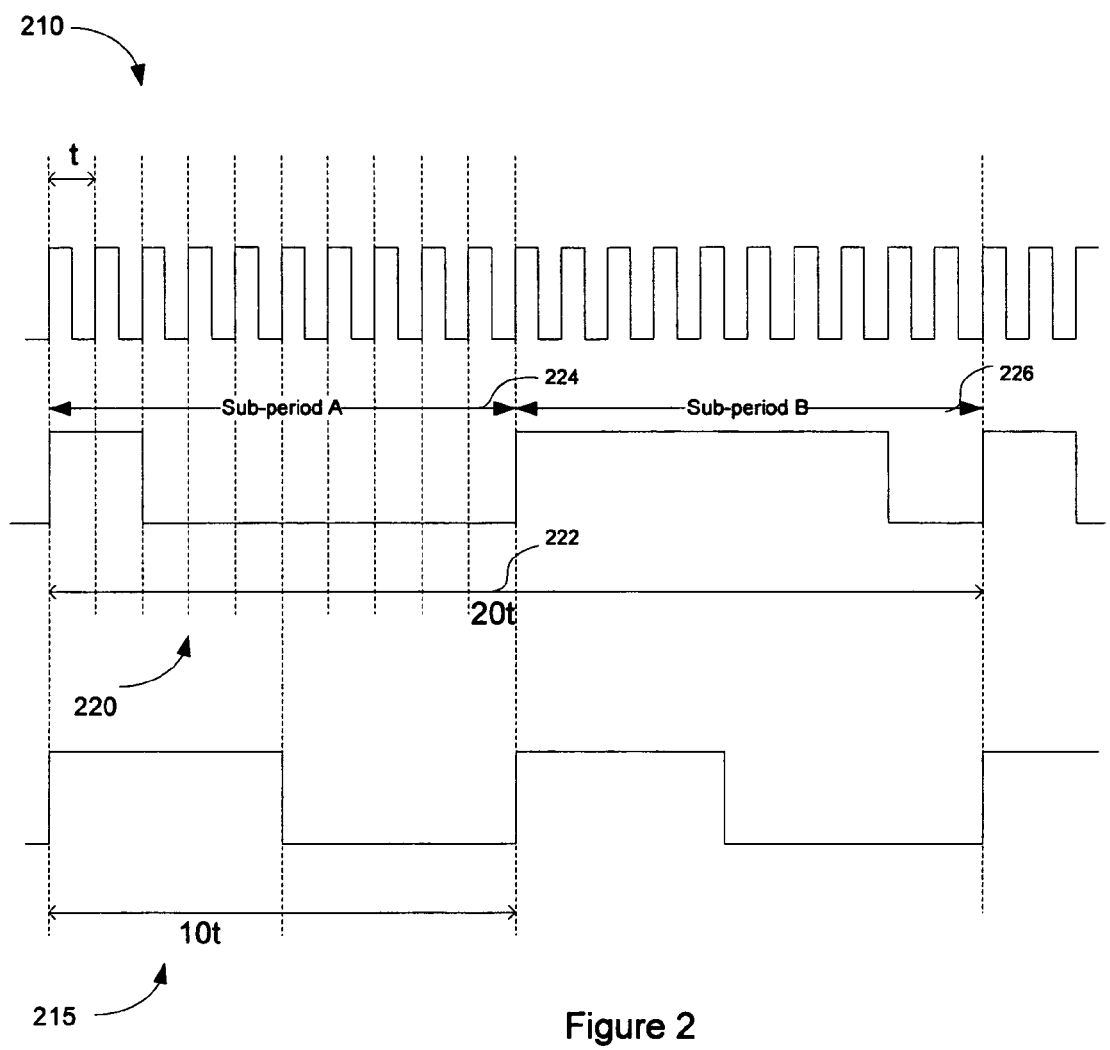
FIG. 2 shows some exemplary embodiments of clock signal waveforms.

FIG. 2 shows exemplary embodiments of clock signal waveforms. Waveform 210 is a clock signal generated on a chip within a chip set. The period of waveform 210 is t, and thus, the frequency of waveform 210 is 1/t. A data pattern generator (e.g., the data pattern generator 120 in FIG. 1) clocked by the clock signal corresponding to waveform 210 may output a repeated 20-bit data pattern of "11000000001111111100" to generate waveform 220. The fundamental period 222 of waveform 220 is 20 times the period of waveform 210, i.e., 20 t. Thus, the frequency of waveform 220 is 1/(20 t), i.e., $\frac{1}{20}^{th}$ of the frequency of waveform 210. Waveform 220 may be output as a forwarded clock signal from the chip to an interconnect. By reducing the frequency of the forwarded clock signal, EMI emission from the chip may be reduced as shielding and/or grounding is more effective at lower frequencies.

Furthermore, waveform 220 has alternating duty cycles of 20/80 and 80/20 in consecutive sub-periods within the fundamental period 222 (e.g., sub-period A 224 and sub-period B 226), which are complementary. Having complementary duty cycles may allow waveform 220 to maintain DC balance, which allows differential signals to maintain zero DC offset between the differential pair in interconnects (e.g., cables) that carry waveform 220.

To further appreciate the advantages of the EMI reduction technique disclosed herein, waveform 215 generated from waveform 210 using some conventional approach is shown in FIG. 2 for comparison. The period of waveform 215 is 10 t, and thus, the frequency of waveform 215 is 1/(10 t). Waveform 215 has a frequency equals to about twice the frequency of waveform 220. Note that the rising edges of waveform 215 occur at multiples of 10 t (e.g., 0, 10 t, 20 t, etc.). However, both waveforms 215 and 220 have rising edges occurring at about the same time, e.g., 10 t, 20 t, etc. In other words, the technique described above may lower the frequency of waveform 220 to half of the frequency of waveform 215 while maintaining rising edges at the same time because the fundamental period of waveform 220 is longer than the time between consecutive rising edges of waveform 220. As a result, rising edge triggered receivers may not see any difference between waveforms 215 and 220 as the rising edges of both waveforms 215 and 220 are occurring at about the same time, even though the frequency of waveform 220 is about half of the frequency of waveform 215. Therefore, the EMI reduction technique described herein may be compatible with many existing rising edge triggered receivers.

It should be apparent that the above technique may be applied to create a waveform with falling edges occurring at about the same time as the falling edges of waveform 215 by inverting the data pattern. Hence, the above analysis also applies to falling-edge triggered receivers.

FIG. 3 shows one embodiment of a process to reduce EMI. The process is performed by processing logic that may comprise hardware (e.g., circuitry, dedicated logic, etc.), software (such as a program operable to run on a general-purpose computer system or a dedicated machine), or a combination of both.

Referring to FIG. 3, processing logic generates a repeating data pattern using a clock signal in a chip within a chip set to create a second clock signal having a fundamental frequency lower than the frequency of the clock signal (processing block 310). For instance, the fundamental frequency may be lowered to $\frac{1}{30}^{th}$ of the frequency of the clock signal. In some embodiments, the clock signal serves as a time reference for data transmission between the chip and an interconnect (e.g., a HDMI). Processing logic may alternate duty cycles of the data pattern in consecutive sub-periods (processing block 320). In some embodiments, the duty cycles are complementary, such as 10/90 and 90/10, 20/80 and 80/20, 30/70 and 70/30, etc. Having complementary duty cycles may allow the second clock signal to maintain DC balance, which is necessary for differential signals to maintain zero DC offset between the differential pair.

In some embodiments, the repeating data pattern is output via one of the data channels of the chip as a forwarded clock signal (processing block 330). Since the forwarded clock signal has a fundamental frequency lower than the frequency of the clock signal, signal power will be redistributed to the lower fundamental frequency, which may reduce EMI emission from the chip.

Figure 4:
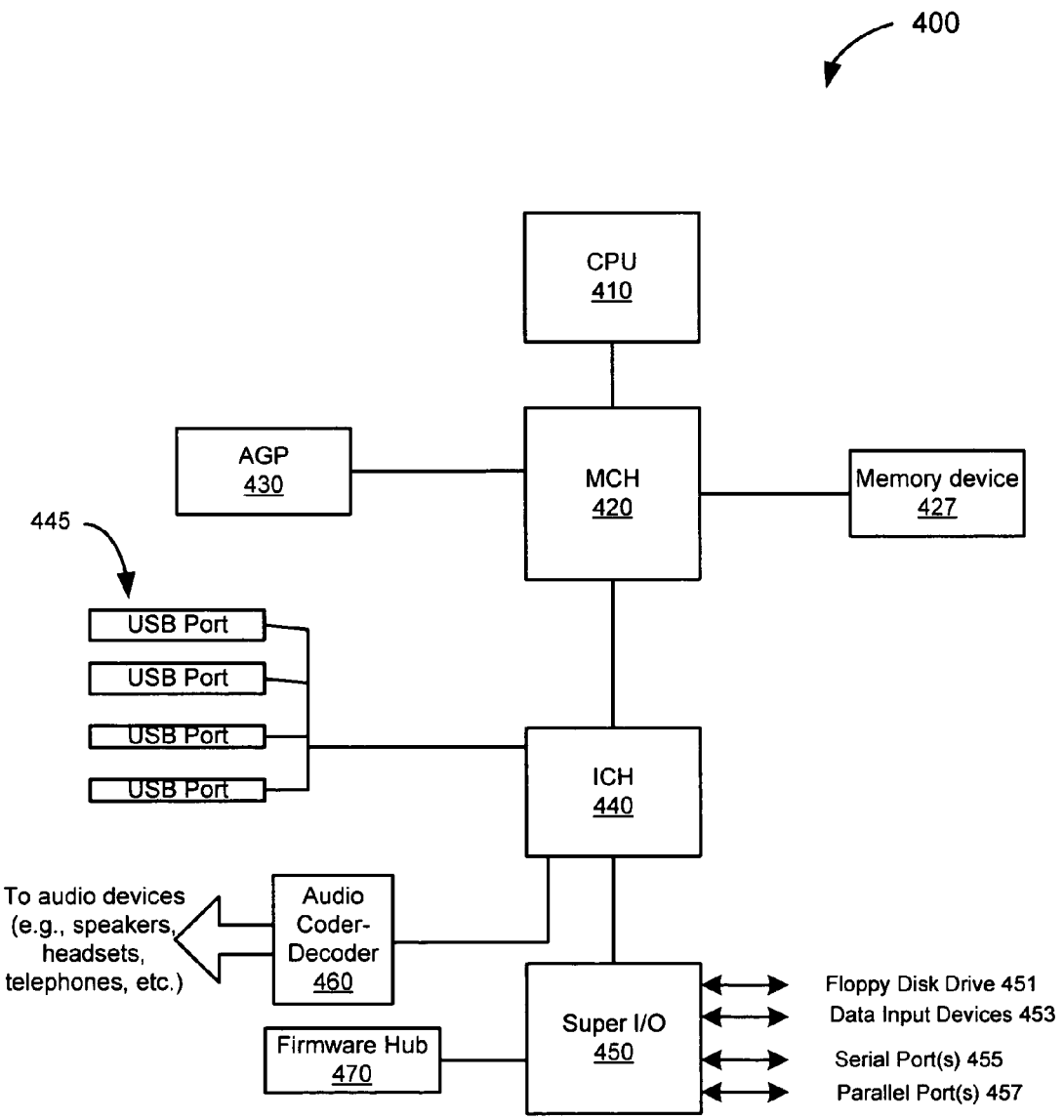
FIG. 4 shows an exemplary embodiment of a computer system.

FIG. 4 shows an exemplary embodiment of a computer system usable with some embodiments of the invention. The computer system 400 includes a central processing unit (CPU) 410, a memory controller 420, a memory device 427, an advance graphic port (AGP) 430, an I/O hub 440, a number of network interfaces (such as Universal Serial Bus (USB) ports 445, Super Input/Output (Super I/O) 450, etc.) an audio coder-decoder 460, and a firmware hub (FWH) 470.

In one embodiment, the CPU 410, the graphic port 430, the memory device 427, and the ICH 440 are coupled to the memory controller 420. The memory controller 420 routes data to and from the memory device 427. The memory device 427 may include various types of memories, such as, for example, dynamic random access memory (DRAM), synchronous dynamic random access memory (SDRAM), double data rate (DDR) SDRAM, etc. In one embodiment, the USB ports 445, the audio coder-decoder 460, and the Super I/O 450 are coupled to the I/O hub 440. The Super I/O 450 may be further coupled to a firmware hub 470, a floppy disk drive 451, data input devices 453 (e.g., a keyboard, a mouse, etc.), a number of serial ports 455, and a number of parallel ports 457. The audio coder-decoder 460 may be coupled to various audio devices, such as speakers, headsets, telephones, etc.

The EMI reduction technique described above may be applied to various chips in the computer system 400, such as the I/O hub 440. Details of some embodiments of the I/O hub 440 have been discussed above with reference to FIG. 1.

Note that any or all of the components and the associated hardware illustrated in FIG. 4 may be used in various embodiments of the computer system 400. However, it should be appreciated that other configurations of the computer system may include one or more additional devices not shown in FIG. 4. Furthermore, one should appreciate that the technique disclosed is applicable to different types of system environment, such as a multi-drop environment or a point-to-point environment. Likewise, the disclosed technique is applicable to both mobile and desktop computing systems.

Some portions of the preceding detailed description have been presented in terms of symbolic representations of operations on data bits within a computer memory. These descriptions and representations are the tools used by those skilled in the data processing arts to most effectively convey the substance of their work to others skilled in the art. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations described herein. This apparatus may be specially constructed for the required purposes, or it may comprise a general-purpose computer selectively activated or reconfigured by a computer program stored in the computer. Such a computer program may be stored in a machine-accessible storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will appear from the description below. In addition, embodiments of the present invention are not described with reference to any particular programming language. It will be appreciated that a variety of programming languages may be used to implement the teachings as described herein.

The foregoing discussion merely describes some exemplary embodiments of the present invention. One skilled in the art will readily recognize from such discussion, the accompanying drawings and the claims that various modifications can be made without departing from the spirit and scope of the subject matter.

What is claimed is:

1. A method comprising:
using a first clock signal to create a second clock signal having a fundamental frequency lower than a frequency of the first clock signal, wherein the first clock signal is usable as a time reference for data transmission from a chip within a chip set to an interconnect;
outputting the second clock signal to the interconnect via a data channel of the chip as a forwarded clock signal;
redistributing signal power to the lower fundamental frequency to reduce electromagnetic interference (EMI) emission from the chip; and
alternating duty cycles of the second clock signal in consecutive sub-periods within a fundamental period of the second clock signal.

2. The method of claim 1, wherein the duty cycles of the second clock signal in the consecutive clock periods are complementary.

3. The method of claim 1, wherein using the first clock signal to create the second clock signal comprises:
outputting a repeating data pattern clocked by the first clock signal, the repeating data pattern including an equal number of 1's and 0's.

4. The method of claim 3, further comprising:
extending the repeating data pattern to reduce the fundamental frequency to increase shielding effectiveness of the chip and the interconnect.

5. A machine-accessible medium that provides instructions that, if executed by a processor, will cause the processor to perform operations comprising:
using a first clock signal to create a second clock signal having a fundamental frequency lower than a frequency of the first clock signal, wherein the first clock signal is used to transmit data from a chip within a chip set to an interconnect;

outputting the second clock signal to the interconnect via a data channel of the chip as a forwarded clock signal;

redistributing signal power to the lower fundamental frequency to reduce electromagnetic interference (EMI) emission from the chip; and alternating duty cycles of the second clock signal in consecutive sub-periods within a fundamental period of the second clock signal.

6. The machine-accessible medium of claim 5, wherein the duty cycles of the second clock signal in the consecutive clock periods are complementary.

7. The machine-accessible medium of claim 5, wherein using the first clock signal to create the second clock signal comprises:

outputting a repeating data pattern clocked by the first clock signal, the repeating data pattern including an equal number of 1's and 0's.

8. The machine-accessible medium of claim 7, wherein the operations further comprise:

extending the repeating data pattern to reduce the fundamental frequency to increase shielding effectiveness of the chip and the interconnect.

* * * * *